Fig.1

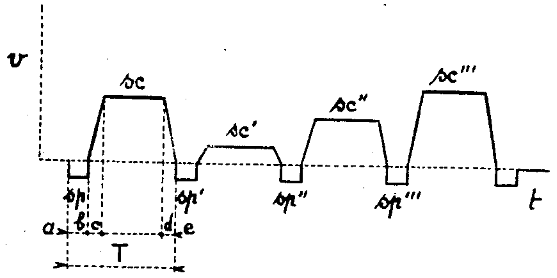

| 1 | 2 | 3 | | | | | | | |
|---|---|---|---|---|---|---|---|---|---|
| N° of steps (rhythmic code) | Range of letters | Range of numbers | N° of impulses non rhythmic code | | | | | | |
| | | | START | 1 | 2 | 3 | 4 | 5 | STOP |
| 1 | A | — | | o | o | | | | o |
| 2 | B | ? | | o | | | o | o | o |
| 3 | C | : | | | o | o | o | | o |
| 4 | D | 1) | | o | | | o | | o |
| 5 | E | 3 | | o | | | | | o |
| 6 | F | 1) | | o | | o | o | | o |
| 7 | G | 1) | | | o | | o | o | o |
| 8 | H | 1) | | | | o | | o | o |
| 9 | I | 8 | | | o | o | | | o |
| 10 | J | Audio signal | | o | o | | o | | o |
| 11 | K | ( | | o | o | | o | | o |
| 12 | L | ) | | | o | | | o | o |
| 13 | M | . | | | | o | o | o | o |
| 14 | N | , | | | | o | o | | o |
| 15 | O | 9 | | | | | o | o | o |
| 16 | P | 0 | | | o | o | | o | o |
| 17 | Q | 1 | | o | o | o | | o | o |
| 18 | R | 4 | | | o | | o | | o |
| 19 | S | ' | | o | | o | | | o |
| 20 | T | 5 | | | | | | o | o |
| 21 | U | 7 | | o | o | o | | | o |
| 22 | V | = | | | o | o | o | o | o |
| 23 | W | 2 | | o | o | | | o | o |
| 24 | X | / | | o | | o | o | o | o |
| 25 | Y | 6 | | o | | o | | o | o |
| 26 | Z | + | | o | | | | o | o |
| 27 | Carriage return | | | | | | o | | o |
| 28 | Line change | | | | o | | | | o |
| 29 | Letters | | | o | o | o | o | o | o |
| 30 | Numbers | | | o | o | | o | o | o |
| 31 | Space | | | | | o | | | o |

| Symbols | Closed loop operation |
|---|---|
| | No current |
| o | Positive current |

1) Available

2) For imprinting on paper

Fig.2.—International Telegraphic Alphabet n°2

INVENTOR
GEORGES VALENSI
BY Michael S. Striker
Attorney

March 22, 1960 G. VALENSI 2,929,873
TELEGRAPHIC CODE CONVERTING DEVICE
Filed Jan. 11, 1955
2 Sheets-Sheet 2
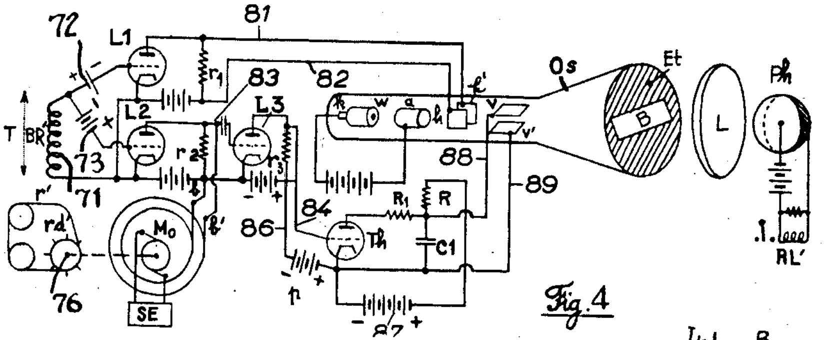
Fig. 4
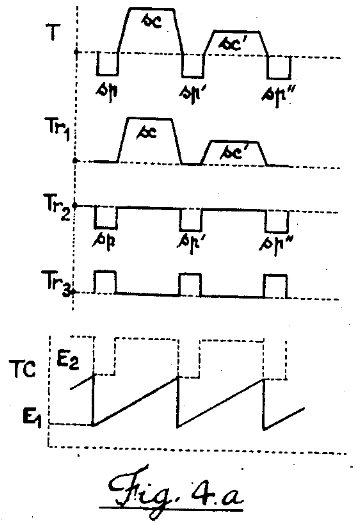
Fig. 4.a
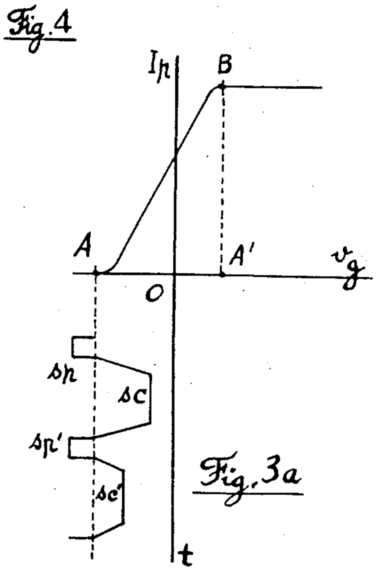
Fig. 3a
Fig. 5
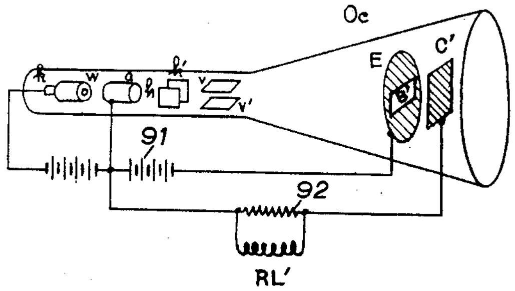
Fig. 3b
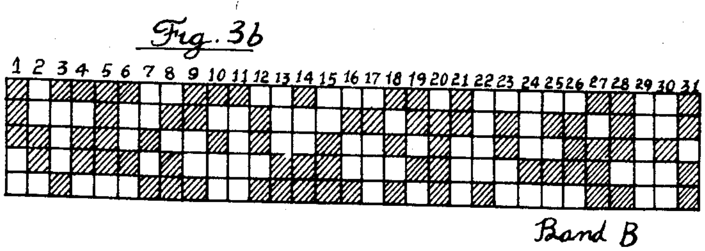
INVENTOR:
GEORGES VALENSI
BY:
Michael S. Striker
agt.

2,929,873
Patented Mar. 22, 1960

2,929,873

TELEGRAPHIC CODE CONVERTING DEVICE

Georges Valensi, Paris, France

Application January 11, 1955, Serial No. 481,250
Claims priority, application France January 13, 1954
3 Claims. (Cl. 178—26)

The present invention relates to a telegraphic code converting device, and more particularly to a device of this kind to be used in the receiver station of a telegraph system.

It is a main object of this invention to provide for a telegraphic code converting device to be used in a telegraphic system in which are recorded, at the receiving station, on a magnetic tape, for each received character, a preliminary negative pulse for synchronizing purposes and a positive code pulse of constant duration, but of varying amplitude, said amplitude determining the particular character. Specifically, it is intended to provide such telegraphic code converting device which would permit the use of a conventional teleprinter receiver adapted to the use of a "non-rhythmic" code, while an "optimal rhythmic code" is used in the transmission of telegrams at high speed and with a great efficiency on a modern telephone circuit.

It is a further object of this invention to provide for a telegraphic code converting device of the type set forth, which is comparatively simple in construction and entirely reliable and efficient in service.

With above objects in view, a telegraphic code converting device according to the invention comprises, in combination, a motor running at a constant speed under the control of the recorded preliminary synchronizing pulses, the shaft of the motor being mechanically coupled with the shaft of the magnetic recorder and also with the shaft of the motor of a conventional teleprinter receiver adapted to be energized by sets of five pulses corresponding respectively to the various received characters; an electric saw-tooth wave generator triggered by the recorded negative synchronizing pulses; a cathode ray tube; and a coding screen associated with the cathode ray tube and having a plurality of columns, each constituted by five juxtaposed sequentially alternating transparent and opaque squares corresponding to a particular character in the telegraphic teleprinter code, the cathode ray beam being (for each received character) first positioned horizontally by the positive code pulse exactly at the bottom of the desired column corresponding to the received character on the coding screen, and being afterwards moved vertically by the electric saw-tooth wave for scanning the desired column, whereby the proper set of five pulses corresponding to the received character in the teleprinter code is generated and energizes the receiving relay of the conventional teleprinter receiver.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is graphical representation of the wave shape of the recorded rhythmic, continuous code signals in terms of the so-called "optimal rhythmic code";

Fig. 2 is a chart showing one non-rhythmic, intermittent telegraphic code system known as the international telegraphic system No. 2;

Fig. 3*a* is a graphical representation of the plate current characteristic of vacuum tubes used in the apparatus shown in Fig. 4;

Fig. 3*b* is an arrangement of opaque and transparent squares which is used in the electro-optical system of Figs. 4 and 5;

Fig. 4 is a schematic diagram of a preferred embodiment of converting apparatus used for converting received rhythmic code signals into non-rhythmic code signals;

Fig. 4*a* is a graphical representation of the wave forms of voltages appearing at different points of the circuit illustrated in Fig. 4; and Fig. 5 is a schematic diagram showing a modification of the apparatus for converting the rhythmic into non-rhythmic code signals as illustrated by Fig. 4.

For the purpose of explaining the present invention and particularly the embodiments described below, it may be assumed that the transmitting station sending the code signals processed by the code converting device according to the invention is in conformity with Figs. 4 and 10 of my U.S. Patent No. 2,620,394 so that the telegraphic signals sent over the telephone line are those of the "optimal rhythmic code" represented by Fig. 1 in the appended drawings.

Referring now to the drawings and more particularly to Fig. 1 the wave shapes of an optimal rhythmic code signal is shown. The abscissa $t$ represents the time axis and the ordinate $v$ represents the voltage amplitude of the impulse. From Fig. 1 it can be seen that each of the positive impulses $sc \ldots sc'''$ are preceded by a negative impulse $sp \ldots sp'''$ respectively. The positive impulses $sc$ represent the code signal. Each of the positive impulses has a different amplitude corresponding to the particular character of the message to be transmitted. The period of the positive impulses $sc$ however is also constant. The small negative impulses $sp$ are the preliminary signals which have the same amplitude and period.

The effective frequency band of conventional telephone lines used between transmitting and receiving stations is approximately 3100 cycles per second. That is, conventional telephone lines will pass frequencies between the range of 300–3400 cycles per second. Therefore the periods of the preliminary and code signals can be arranged in the following manner:

and $$ab=\frac{3T}{10};\ bc=de=\frac{T}{10}$$

and $$cd=\frac{5T}{10}$$

where $ab$ is the period of the preliminary signal, $bc$ and $de$ are the duration of the leading and trailing edges respectively of each of the code signals and $cd$ is the duration of the constant amplitude portion of the code signal. The overall period T for the preliminary and code signal is equal to $ae$ and is always constant regardless of the character to be transmitted.

Therefore, in the optimal rhythmic code signal there is no time lapse between adjacent impulses and the period of each of the impulses is constant and equal to the period of all other impulses. The amplitude of the code signal is the only dimension that varies to distinguish one of the characters from the other.

Referring now to Fig. 2 a chart indicating a conventional non-rhythmic code is illustrated. In the second column of Fig. 1, the range of letters to be transmitted is shown and of course varies from A through Z. In column 3, the range of numbers to be transmitted is shown and also includes the other characters normally appearing on a typewriter keyboard such as punctuation marks etc. In the seven small columns to the right of column 3 is shown the code arrangement for each of the numbers and letters.

For each character (number or letter) seven impulses are used. The first impulse is to indicate the start of a new character and the last impulse is to indicate the end of the transmitted character. The five impulses inbetween are used to identify the character to be transmitted. An O in each of these columns indicates that a positive impulse is transmitted and where the box of the columns are left blank, this is an indication that no current impulses are transmitted.

At the receiving station, the telegraphic signals received in terms of the "optimal rhythmic code" are recorded at great speed on a magnetic tape (*r'* in Fig. 4), the magnetic tape recorder being connected at the end of the telephone circuit. When all the telegrams are so received at great speed, the telephone circuit is disconnected. The recorded telegraphic signals, namely, preliminary signals *sp, sp', sp''* . . . and code signals *sc, sc', sc''* . . ., as shown in Fig. 1, are then converted by means of the device described below in sets of five pulses for energizing at a lower speed the receiving relay of a conventional teleprinter receiver, as shown as RL' in Figs. 4 and 5.

Referring to Fig. 4, the shaft of electric motor M*o* is connected by mechanical linkage to the shaft 76 of the magnetic tape recorder (sprocket wheel *rd'*), and also to the shaft of the motor (not illustrated on Fig. 4) of a conventional teleprinter receiver, the receiving relay of which is RL'. Adjacent the magnetic tape *r'* is the reproducing head BR' having a winding 71. Connected to one end of the winding 71 through a negative biasing battery 72 is the control grid of a vacuum tube L1 having its cathode connected to the other end of the winding 71.

Connected to the same end of the winding 71 through a positive grid biasing battery 73 is the control grid of a second vacuum tube L2 having its cathode connected to the other end of the winding 71. Connected across the output of tube L1 is the output resistor *r*1; the voltage across *r*1 is applied, on conductors 81 and 82, to the horizontal deflecting plates of a cathode ray tube O*s*. Connected across the output of tube L2 is the output resistor *r*2, in parallel with the brushes *b* and *b'* of electric motor M*o* energized by the power source SE.

The plate characteristics of the tubes L1 and L2 are shown in Fig. 3*a*, with the grid voltage along the abscissa and the plate current along the ordinate. It can be seen that if the potential of the negative biasing battery 72 is set equal to OA, tube L1 will conduct only for positive impulses; similarly, if the positive biasing battery 73 is set equal to OA', the plate current through the tube L2 will remain constant unless a negative impulse is applied. Therefore, the output voltage across resistor *r*2 will have the shape T*r*2 in Fig. 4*a*, and the output voltage across resistor *r*1 will have the shape T*r*1 in Fig. 4.

The output voltage across the resistor *r*2 while being applied to the synchronization circuit *b*, *b'* of the motor M*o* is also applied to a coupling condenser 83 to the control grid of an inverter tube L3. The output voltage appearing across resistor *r*1 is shown at T*r*1 in Fig. 4*a* and the output voltage appearing across the resistor *r*2 is shown at T*r*2. The inverted voltage appearing across the output resistor *r*3 of the inverter tube L3 is shown at T*r*3. It is apparent that the voltage T*r*3 is exactly the same as the voltage T*r*2 except that it is positive.

The output voltage from resistor *r*3 is applied on conductors 84 and 86 to the control grid and cathode respectively of a thyratron T*h*. A cathode biasing battery *p* is in series with the conductor 86. The energizing battery for the thyratron is the battery 87 which is applied to the plate of the thyratron through resistor R and R1. Between the junction point of the resistors R and R1 and the cathode of the thyratron is connected the capacitor C1.

The output for the capacitor C1 is applied on conductors 88 and 89 to the vertical deflecting plates of the cathode ray tube O*s*. Next to the fluorescent screen of the cathode ray tube O*s* is placed a transparent screen E*t*. The screen E*t* is made opaque except for a band B placed at the center thereof and composed of successive vertical rectangles corresponding to the different characters of the non-rhythmic code as shown in Fig. 3*b*. Any light passing through the band B at a given moment is condensed by the lens L and is applied to the photosensitive surface of the photoelectric cell P*h*. The ouput of the photoelectric cell is applied to the line relay RL' of the non-rhythmic teleprinter apparatus.

In operation the thyratron tube T*h* is normally not conducting so that the condenser C1 is charged by the battery 87. When the voltage T*r*3, corresponding in time to the preliminary signal *sp* but of opposite phase, is applied to the grid of the thyratron the ionizing potential of the thyratron is decreased and varies as shown in the dotted line E2 of Fig. 4*a*. When the thyratron discharges due to the maximum applied amplitude of the impulse T*r*3, the condenser C1 discharges through the thyratron. The voltage across the condenser falls rapidly until that voltage is reached where the thyratron can no longer support the conduction. At this point the thyratron will stop conducting and the condenser will be recharged to start the next cycle. This results in the triangular voltage shown at TC in Fig. 5*a* across the condenser which is applied to the vertical deflecting plates of the cathode ray tube.

Therefore when the magnetic tape produces the rhythmic voltages impulses shown at T across the reproducing head winding BR' the voltage across the horizontal plates of the cathode ray tube will have the shape shown at T*r*1 of Fig. 4*a*. Accordingly the electron beam of the cathode ray tube will be horizontally positioned at the proper column of the band B. The electron beam will remain in the fixed horizontal position for the duration of the constant amplitude of the voltage T*r*1.

As can be seen in Fig. 4*a* during the same time interval the triangular voltage applied to the vertical plates of the cathode ray tube will vertically displace the electron beam so that it scans the successive rectangles of the chosen column in band B. Therefore the light impulses emitted through the screen E*t* will be arranged in time to correspond to the non-rhythmic, intermittent code signals used to operate the conventional teleprinter. These light impulses are converted to voltage impulses by the photoelectric cell P*h* and act to operate the line relay RL' of the conventional teleprinter.

Referring now to Fig. 5 a second embodiment of apparatus capable of converting the rhythmic, continuous code signals into the conventional non-rhythmic code signals is shown. The connections to the cathode ray tube are the same as those shown in Fig. 4. Accordingly the electron beam of the cathode ray tube is deflected in the same manner as described hereinabove for the embodiment shown in Fig. 4. However, in Fig. 5, the photoelectric cell and lens combination has been replaced by a purely electrical combination.

In the enlarged part of the cathode ray tube O*c* an electrode E is located having a central portion consisting of a perforated grid B'. The configuration of the perforated grid corresponds to the diagram of Fig. 3*b*. In this case the clear squares are open and the cross hatched squares are solid. Behind the electrode E is a collector plate C' which receives the electrons emitted from the cathode K. These electrons have been accelerated by the anodes *a* and deflected by the horizontal and vertical deflecting plates respectively in the same manner as described above for Fig. 4.

Accordingly in operation the electron beam passes through the electrode E only by means of the open squares and the solid portions of the electrode E prevent passage of the electrons therethrough. The electrons passing through the perforated grid B' are collected on the collector plate C' and returned to the battery 91 through the resistor 92. Since the line relay of the conventional teleprinter is connected across the resistor 92, it emits impulse signals to activate the various relays of the teleprinter in order to print the received character.

While the invention has been illustrated and described as embodied in telegraphic systems, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a telegraphic system in which are recorded, at the receiving station, by a magnetic recorder on a magnetic tape, for each received character, a preliminary negative pulse for synchronizing purposes and a positive code pulse of constant duration, but of varying amplitude, said amplitude determining said character, a telegraphic code converting device, at said receiving station, comprising, in combination, a motor running at a constant speed under the control of said recorded preliminary synchronizing pulses, the shaft of said motor being mechanically coupled with the shaft of said magnetic recorder and also with the shaft of the motor of a conventional teleprinter receiver adapted to be energized by sets of five pulses corresponding respectively to the various received characters; an electric saw-tooth wave generator triggered by said recorded negative synchronizing pulses; a cathode ray tube and a coding screen associated with said cathode ray tube and having a plurality of columns, each constituted by five juxtaposed sequentially alternating transparent and opaque squares corresponding to a particular character in the telegraphic teleprinter code, the cathode ray beam being (for each received character) first positioned horizontally by the positive code pulse exactly at the bottom of the desired column corresponding to said received character on said coding screen, and being afterwards moved vertically by said electric saw-tooth wave for scanning said desired column, whereby the proper set of five pulses corresponding to said received character in the teleprinter code is generated and energizes the receiving relay of said conventional teleprinter receiver.

2. A telegraphic code converting device in accordance with claim 1 comprising, in combination, a magnetic tape driven by said motor and carrying a previously recorded signal consisting, for each received character, of a preliminary negative synchronizing pulse and a positive code pulse of constant duration, but of varying amplitude, said amplitude determining said received character; a thyratron, triggered by said recorded negative synchronizing pulses, for generating an electric saw-tooth wave; said cathode ray tube being provided with a fluorescent screen; a photoelectric cell; said coding screen being interposed between said fluorescent screen and said photoelectric cell, said coding screen having a plurality of columns each constituted by five juxtaposed squares, sequentially alternating transparent and opaque for the light emitted by said fluorescent screen, in accordance with the telegraphic teleprinter code, said recorded positive code pulse positioning the cathode ray beam horizontally on said fluorescent screen exactly in front of the bottom of the desired column corresponding to the particular received character on said coding screen, and said saw-tooth electric wave moving afterwards vertically said cathode ray beam for scanning said desired column, whereby said photoelectric cell energizes the receiving relay of a conventional teleprinter receiver with the proper set of five pulses produced by the fluorescent light passing through the transparent squares of said coding screen, said receiving relay being connected at the output of said photoelectric cell.

3. A telegraphic code converting device in accordance with claim 1 comprising, in combination, a magnetic tape driven by said motor and carrying a previously recorded signal consisting, for each received character, of a preliminary negative synchronizing pulse and a positive code pulse of constant duration, but of varying amplitude, said amplitude determining said received character; a thyratron, triggered by said recorded negative synchronizing pulses, for generating an electric saw-tooth wave; said cathode ray tube having a collecting electrode in front of which is located another electrode acting as coding screen and having a central portion consisting of a perforated grid made of columns, each constituted by five juxtaposed squares, sequentially alternating clear and solid, and therefore either transparent or opaque for the electron beam of said cathode ray tube, in accordance with the telegraphic teleprinter code, said recorded positive code pulse positioning the cathode ray beam horizontally at the bottom of the desired column corresponding to the particular received character on said perforated grid, and said saw-tooth electric wave moving afterwards vertically said cathode ray beam for scanning said desired column, whereby said collecting electrode energizes the receiving relay of a conventional teleprinter receiver with the proper set of five pulses produced by the electrons passing through the clear squares of said perforated grid, said receiving relay being connected at the output of said cathode ray tube.

References Cited in the file of this patent

UNITED STATES PATENTS

| | | |
|---|---|---|
| 2,132,213 | Locke | Oct. 4, 1938 |
| 2,279,353 | Van Duuren | Apr. 14, 1942 |
| 2,612,550 | Jacobi | Sept. 30, 1952 |

OTHER REFERENCES

"An Accurate Digital-Analogue Function Generator," by W. A. Farrand, "Proceedings of Symposium on Electrical Computers, L.A., April 30, May 1, 2, 1952," pages XVL, 1–9; published November 1952.